(12) United States Patent
Dennis et al.

(10) Patent No.: US 9,360,132 B2
(45) Date of Patent: Jun. 7, 2016

(54) DIRECTIONAL FLUID CONTROL VALVE

(75) Inventors: Michael Thomas Dennis, West Yorkshire (GB); Lee Jason Hardman, Lancashire (GB)

(73) Assignee: Bifold Fluidpower Limited, Greater Manchester (GB)

( * ) Notice: Subject to any disclaimer, the term of this patent is extended or adjusted under 35 U.S.C. 154(b) by 175 days.

(21) Appl. No.: 14/241,582

(22) PCT Filed: Jul. 9, 2012

(86) PCT No.: PCT/GB2012/051613
§ 371 (c)(1),
(2), (4) Date: Feb. 27, 2014

(87) PCT Pub. No.: WO2013/030526
PCT Pub. Date: Mar. 7, 2013

(65) Prior Publication Data
US 2014/0367599 A1    Dec. 18, 2014

(30) Foreign Application Priority Data

Aug. 31, 2011   (GB) .................................. 1115062.0

(51) Int. Cl.
*F16K 31/524*     (2006.01)
*F16K 39/02*      (2006.01)
*F16K 1/14*       (2006.01)

(52) U.S. Cl.
CPC .............. *F16K 31/52425* (2013.01); *F16K 1/14* (2013.01); *F16K 39/022* (2013.01); *Y10T 137/7782* (2015.04)

(58) Field of Classification Search
CPC ... F16K 31/52425; F16K 1/14; F16K 39/022; Y10T 137/7782
USPC .......................................... 251/282; 137/495
See application file for complete search history.

(56) References Cited

U.S. PATENT DOCUMENTS 2,409,091 A * 10/1946 Wright .................. G05D 16/10
                                                   137/270
2,680,453 A *  6/1954 Prijatel ................. F16K 17/105
                                                   137/490

(Continued)

FOREIGN PATENT DOCUMENTS

DE       1156617 B     10/1963
WO       9401709 A1    1/1994

OTHER PUBLICATIONS

International Preliminary Report on Patentability for Application No. PCT/GB2012/051613 dated Mar. 4, 2014 (10 pages).

(Continued)

*Primary Examiner* — John Bastianelli
(74) *Attorney, Agent, or Firm* — Michael Best & Friedrich LLP (57) ABSTRACT

A valve comprising a housing defining a fluid inlet, a fluid outlet and a fluid path, a valve chamber in the fluid path and having a valve seat, a valve member moveable between an open position in which the valve member is displaced from the valve seat such that the fluid inlet is connected to the fluid outlet and a closed position, and first and second opposed biasing members of unequal loading applying a resulting biasing force to the valve member so as to bias it towards the closed position, a first piston member movable in a first bore relative to the valve for moving the valve member in a first direction, and a second piston member for moving the valve member in a second direction, a first pressure compensation passage, and a second pressure compensation passage.

15 Claims, 4 Drawing Sheets

(56) References Cited

U.S. PATENT DOCUMENTS

| | | | | |
|---|---|---|---|---|
| 2,797,061 A | * | 6/1957 | Buchanan | F16K 31/0655 251/129.03 |
| 2,800,143 A | * | 7/1957 | Keller | F15B 13/0435 122/240.1 |
| 2,815,921 A | * | 12/1957 | Bigelow | F16K 47/023 251/282 |
| 2,881,793 A | * | 4/1959 | Lee | F15B 13/0417 137/501 |
| 3,029,061 A | * | 4/1962 | Hoxworth | F16K 31/122 251/282 |
| 3,033,228 A | * | 5/1962 | Mohler | F16K 31/408 137/490 |
| 3,177,892 A | * | 4/1965 | Grandstaff | G05D 7/0106 137/501 |
| 3,421,546 A | | 1/1969 | Jennings et al. | |
| 3,756,283 A | | 9/1973 | Angelery | |
| 4,762,141 A | * | 8/1988 | Karpis | G05D 7/03 137/312 |
| 2008/0196774 A1 | | 8/2008 | Weston | |

OTHER PUBLICATIONS

International Search Report for International Application No. PCT/GB2012/051613 dated Sep. 19, 2012 (3 pages).

* cited by examiner

SECTION A-A

FIG. 2

SECTION C-C

DIRECTIONAL FLUID CONTROL VALVE

BACKGROUND

The present invention relates to a directional fluid control valve and more particularly, but not exclusively, to a high pressure valve of this kind for use in the oil, gas and petrochemical industries.

Directional fluid control valves typically comprise a valve body having a plurality of ports that provide communication between internal flow passages and external flow paths to or from other components. One or more valve members are moveable within the valve body between different switching positions to open or close the flow passages selectively and control the flow direction between ports.

Such valves are typically characterised by the number of ports ("ways") and the number of discrete switching positions they provide. One example of a simple, common directional control valve is a two-position, two-way fluid control valve that provides selective communication between inlet and outlet ports. In such a valve, the valve member is biased by a spring into a first position in which it is either open or closed and an actuating force is applied by an actuator to overcome the spring force so as to move the valve member to the second position. However, the applied force must also be sufficient to overcome any imbalance in fluid pressure acting on the valve member and therefore the magnitude is related to the working fluid pressure of the control valve. In applications where there are high working fluid pressures, e.g., in pipelines for transporting fluid such as oil or gas at high pressures undersea or otherwise, the forces required to actuate the valve may be very large and even heavy duty solenoids actuators are not sufficient to operate the valve. In such applications there is a tendency therefore to use rotary ball valves. These can be used to allow for safe isolation of parts of the pipeline from fluid flow for the purposes of, for example, repair or maintenance. Such valves comprise a housing with an inlet and an outlet aligned for connection into the pipeline and a valve element in the form of a ball that is penetrated by a bore. The ball is disposed between the inlet and outlet and is rotatable relative to valve seats. Selective rotation of the ball brings the bore into and out of register with the inlet and outlet so as to permit or prevent flow between them. Actuation of the ball valve may be effected in several ways. For example it may be operated by a dedicated actuator (e.g. a pneumatically operated piston and cylinder) that is remotely operated. Alternatively, it may be operated manually by divers or by using a ROV.

The fluid flowing through such valves will often contain contaminants such as small particles of dirt etc. Such contaminants have a tendency to cause wear in rotary ball valves. In particular, as the ball rotates over the valve seat the contaminants can cause wear in the seat. Rotary ball valves thus have a limited number of valve operations before the valve seat deteriorates and internal leakage occurs.

At very high pressures the torque required to operate a rotary ball valve can be excessive.

There is a desire for a simple, inexpensive, yet robust valve in which the actuation force is reduced in comparison to traditional valve mechanisms.

SUMMARY

It is one object of the present invention to obviate or mitigate the aforesaid disadvantages. It is also an object of the present invention to provide for an improved or alternative valve.

According to a first aspect of the present invention there is provided a valve comprising a housing defining a fluid inlet, a fluid outlet and a fluid path extending between the fluid inlet and fluid outlet; a valve chamber in the fluid path; the valve chamber having a least one valve seat; a valve member moveable along a first axis in the chamber between an open position in which the valve member is displaced from the valve seat such that the fluid inlet is connected to the fluid outlet and a closed position in which the valve member is sealed against the valve seat so that the fluid path is closed; first and second opposed biasing members of unequal loading applying a resulting biasing force to the valve member so as to bias it towards the closed position; a first piston member movable in a first bore relative to the valve and for moving the valve member in a first direction along the first axis, and second piston member movable in a second bore relative to the valve member for moving the valve member along the first axis in a second direction opposite to the first direction, a first pressure compensation passage extending between the fluid inlet and the first bore such that the first piston member is actuable by the fluid pressure in the fluid inlet, a second pressure compensation passage extending between the fluid outlet and the second bore such that the second piston member is actuable by the fluid pressure in the fluid outlet; and an actuator for moving the valve member from the closed position to the open position.

The pressure compensation provided by redirecting a portion of the inlet and outlet fluid to the first and second pressure compensation passages significantly reduces the force required to operate the actuator at high pressures.

The first and second pistons may take any suitable form. For example, they may comprise a piston head and a piston rod or may simply comprise a member that defines one or more pressure surfaces on which the pressure of the fluid acts to apply one or more forces, potentially resulting in movement of the piston.

The first and second pistons may act directly on the valve member or alternatively may act indirectly through an intervening component such as, for example, a pin or plunger.

The first piston may effectively divide the first bore into first and second fluid chambers, the first chamber being in fluid communication with one side of the valve member, the second fluid chamber being in fluid communication with the first hydraulic compensation passage. Similarly the second piston may effectively divide the second bore into first and second fluid chambers, the first chamber of the second bore being in fluid communication with one side of the valve member, the second fluid chamber of the second bore being in fluid communication with the second pressure compensation passage.

The first and second pistons preferably act in opposed directions on the valve member. In particular, the first and second bores may be axially aligned.

The first piston may be sealed in the first bore by first and second seals spaced along its length. The first pressure compensation passage may be arranged to supply fluid to the second fluid chamber in the first bore. Similarly the second piston may be sealed in the bore by means of third and fourth seals spaced along its length. The second pressure compensation passage may be arranged to supply fluid to the second fluid chamber of the second bore.

The first piston may define at least one first pressure surface between the first and second seals on which the fluid in the first second chamber may act. The at least one first pressure surface may be in the form of an annular shoulder. The first piston may define at least one second pressure surface that is exposed to fluid in the first fluid chamber. The first fluid chamber may be in fluid communication with the fluid path such that fluid flowing between the inlet and outlet acts on the second pressure surface so as to apply a force in opposition to any force applied to the at least one first pressure surface.

The second piston may define at least one first pressure surface between the third and fourth seals on which the fluid in the second chamber of the second bore may act. The at least one pressure surface may be annular. The second piston may have at least one second pressure surface that is exposed to fluid in the first fluid chamber of the second bore. The first fluid chamber may be in fluid communication with the fluid path such that fluid flowing between the inlet and outlet acts on the second pressure surface so as to apply a force in opposition to any force applied to the at least one first pressure surface of the second piston.

The actuator may be manually-operated by using, for example, a handle. It may comprise an actuator rod for acting on an end of the first piston.

The first and second ports may be axially offset.

The first axis may be transverse (e.g. perpendicular) to the direction of flow through the fluid inlet and outlets.

The valve member may take any suitable form. In one embodiment it is in the form of a sphere.

The valve seat may be a separate member provided in valve chamber of the housing. The valve seat member may have an internal bore that forms part of the first bore. The valve seat member may be penetrated by at least one passage for communication with one of the fluid inlet or fluid outlet. The at least one passage may be in the form of a plurality of passages which may extend substantially in the radial direction. The valve seat member may be sealed to the valve body preferably at axially spaced locations.

The first piston may have an end proximal the valve member. There may be a clearance between that end and the valve seat member.

The actuator may be a cam actuator which may be configured to convert rotational movement of an operating handle into translation of an output member. The output member may be in contact with the first piston such that movement of the output member effects translation of the first piston.

The cam actuator may comprise a pair of cam plates between which there is at least one ball that rides in a cam groove.

The first and second biasing members may be pre-compressed springs. In a preferred embodiment the first and second biasing members act, respectively, on the first and second pistons. The first biasing member may act on the at least one pressure surface of the first piston (which may be in the form of an annular shoulder). The second biasing member may act on at least one pressure surface of the second piston or may act on a member that is in abutment with the second piston such as, for example, a spring seat.

The first biasing member may be provided by a first stack of pre-compressed disc springs. The first stack may have a bore in which part of the first piston may be received. Similarly the second biasing member may be in the form of a second stack of pre-compressed disc springs.

The second piston may be supported for movement in the second bore by means of a bonnet. There may be at least one passage in the bonnet providing communication between the second fluid chamber of the second bore and the second pressure compensation passage. There may be a plurality of such passages which may extend substantially in the radial direction.

At least part of the cam actuator may received within a first housing which is sealed to a main part of the valve body against the ingress of fluid. This ensures that external pressure, such as for example, that provided by seawater at depth does not enter the valve and act on the first piston. Similarly the second biasing member may be received in a second housing that is sealed to a main part of the valve body so as to prevent ingress of external pressure acting on the second piston.

The seal between the first housing and the main part of the valve body may be uni-directional so as to allow the escape of internal pressure in the valve body. Similarly the seal between the second housing and the main part of the valve body may be uni-directional to allow for the escape of internal pressure.

According to a second aspect of the present invention there is provided a two-way two-position valve comprising a housing defining a fluid inlet, a fluid outlet and a fluid path extending between the fluid inlet and fluid outlet; a valve chamber in the fluid path; the valve chamber having a valve seat; a valve member moveable in the chamber between an open position in which the valve member is displaced from the valve seat such that the fluid inlet is connected to the fluid outlet and a closed position in which the valve member is sealed against the valve seat so that the fluid path is closed; first and second opposed biasing members of unequal loading applying a resulting biasing force to the valve member so as to bias it towards the closed position; and an actuator for moving the valve member from the closed position to the open position.

The actuator is operable to move the valve member to the open position against the biasing force providing by the first and second biasing members.

The valve member may be moveable along a first axis. It may be in the form of a sphere.

In one preferred embodiment only a single valve seat is provided.

There may be a first piston member movable in a first bore relative to the valve and for moving the valve member in a first direction along the first axis. There may be a second piston member movable in a second bore relative to the valve member for moving the valve member along the first axis in a second direction opposite to the first direction.

BRIEF DESCRIPTION OF THE DRAWINGS

A specific embodiment of the present invention will now be described, by way of example only, with reference to the accompanying drawings in which.

DETAILED DESCRIPTION

Referring now to the drawings, a two position, two-way cam-operated fluid control valve comprises a generally parallelepiped valve body 1 having inlet and outlet ports 2, 3 for connection into a fluid pipeline (not shown).

The valve body 1 has a central bore 4 of circular cross-section along its longitudinal axis. The bore 4 contains a valve assembly 5 and is partially closed at its ends by upper and lower bonnets 7, 8 that are in threaded engagement with the wall of the bore 4. The body 1 is penetrated on opposite sides by the first and second ports 2, 3 that are axially offset and interconnected by a fluid path defined by part of the central bore 4. The valve is designed such that each of ports 2, 3 may serve as either the inlet or the outlet.

In the region of the bore 4 that is adjacent to the first port 2, the valve assembly 5 comprises a hollow, cylindrical seat bush 9 that is a close tolerance fit in the bore. The bush 9 is sealed to the wall of the bore 4 by means of a sealing arrangement comprising an O-ring 10 and a back-up seal 11 both of which are received in an annular groove defined in the outside of the bush. This sealing arrangement prevents leakage of fluid between the bush 9 and the wall of the bore 4.

Between the seat bush 9 and the upper bonnet 7 there is an upper stack of annular disc springs 12. The outer diameter of the springs 12 is smaller than the diameter of the central bore 4 so as to define a radial clearance which is occupied by a hollow cylindrical spacer 13.

The upper and lower bonnets 7, 8, the seat bush 9 and the disc springs 12 combine to define an inner axial bore 14 within which actuating pistons 15, 16 are free to slide in an axial direction. An upper piston 15 extends through an upper part of the inner axial bore 14, through the disc springs 12 and most of the seat bush 9 whereas a lower piston 16 extends through a lower part of the inner axial bore 14 defined in the lower bonnet 8. Between the pistons 15, 16 there is a valve member 17 in the form of a sphere for selectively preventing fluid flow between the first and second ports 2, 3. The pistons 15, 16 are separate from the valve member 17 and are moveable independently thereof.

The seat bush 9 has an annular recess 18 defined on its outer surface, adjacent to the seals 10, 11, at an axial location coincident with the first port 2. At the recess 18 the bush 9 is penetrated by a plurality of angularly spaced, radially extending ports 19 so as to provide fluid communication between the second port 3 and an enlarged portion 20 of the inner bore 14. The end of the seat bush 9 that faces the valve member 17 provides a valve seat 21 for the valve member 17. In particular it defines an annular seating surface 22 against which the valve member 17 may seal in use. The valve seat 21 has a reduced external diameter and is sealed against an annular shoulder 23 defined in the wall of the central bore 4 by an O-ring seal 24 that prevents fluid leaking around the outside of the seat 21.

Figure 1:
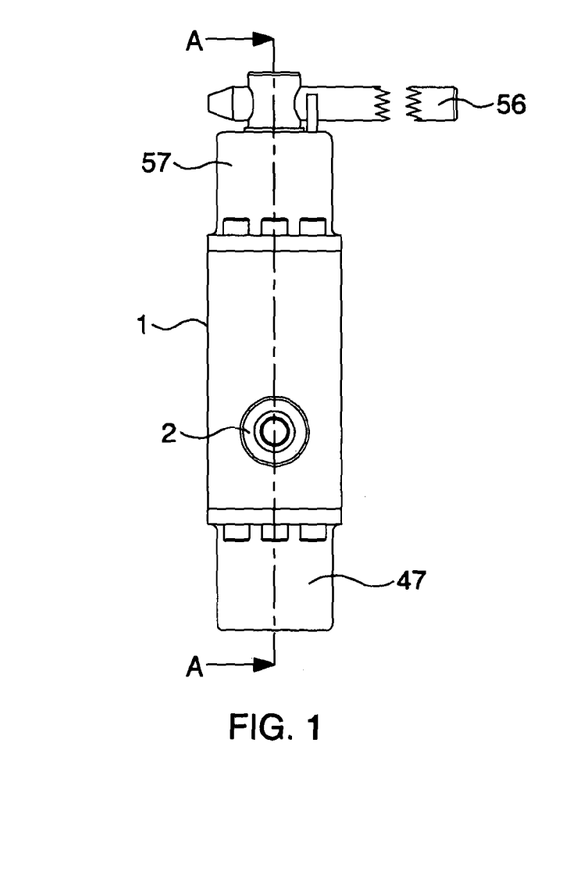
FIG. 1 is a side view of two-way, two-position fluid control valve in accordance with an embodiment of the present invention.
Figure 2:
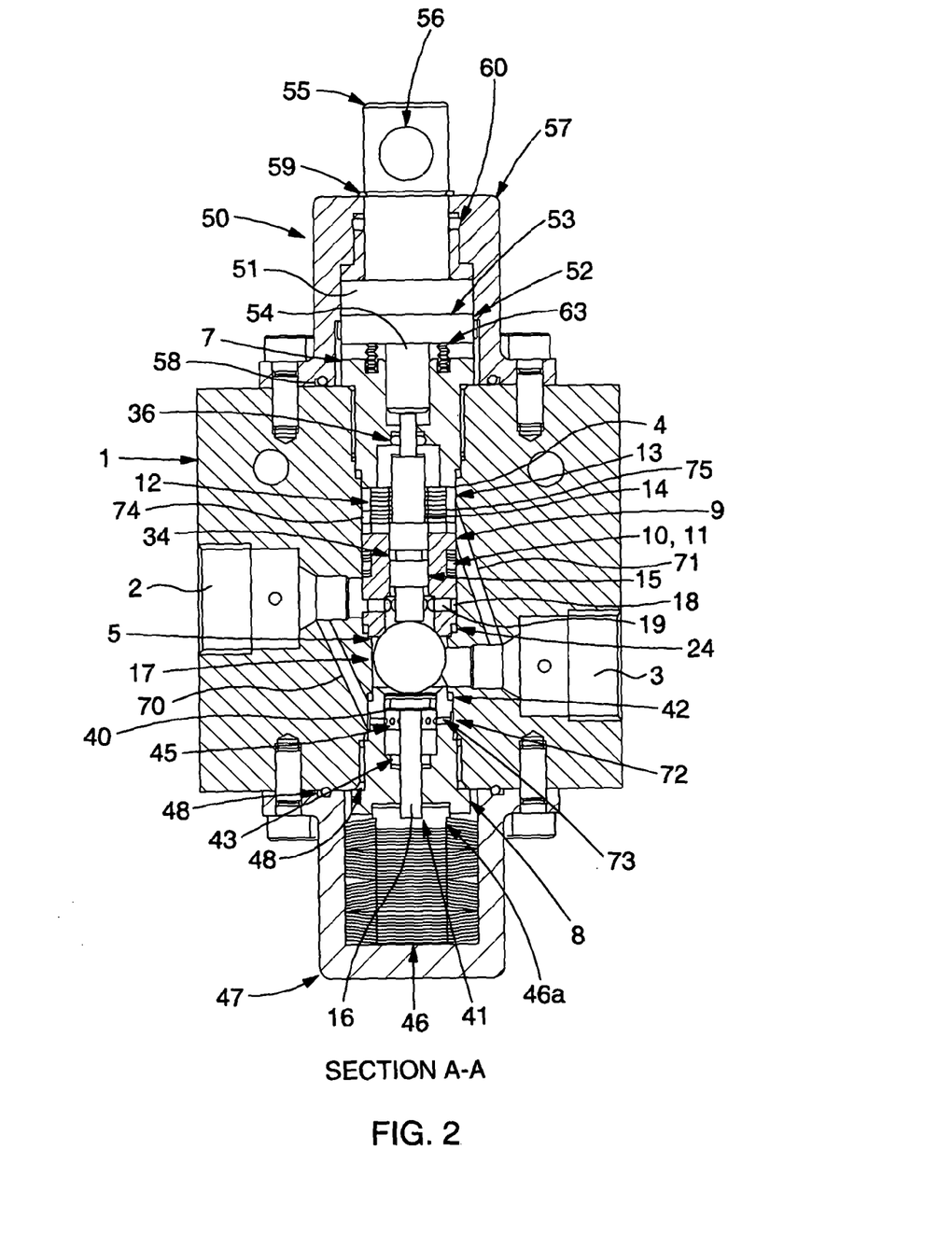
FIG. 2 is a sectioned view of the valve of along line A-A of FIG. 1, the valve being in the closed position.
Figure 3:
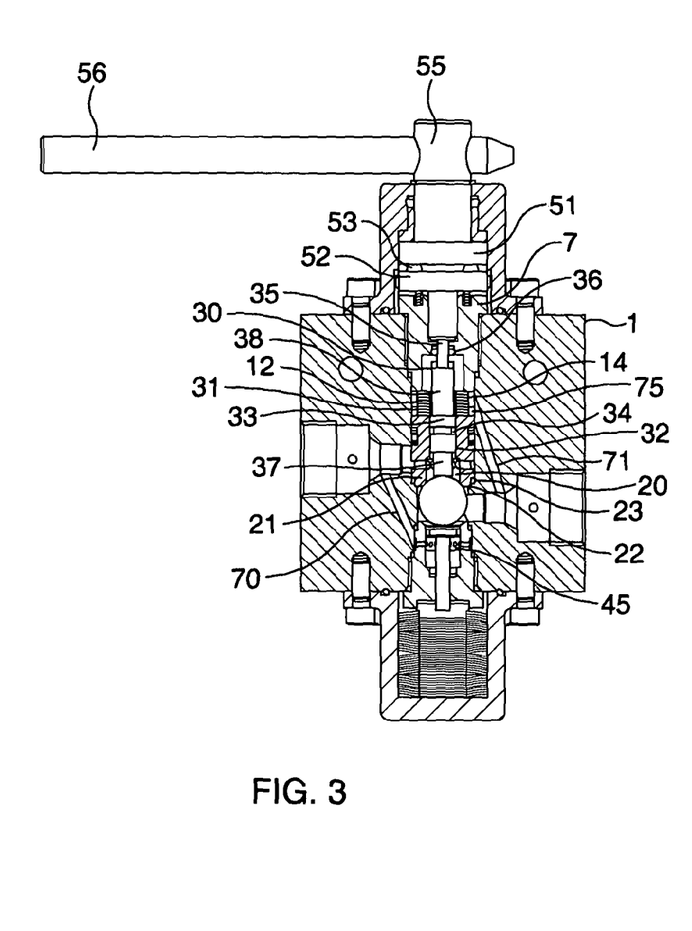
FIG. 3 is a sectioned view corresponding to FIG. 2 but with the valve shown in the open position.

The upper piston 15 is stepped in several places so as to define three annular shoulders 30, 31, 32 (see FIG. 3) that divide the body of the piston into four sections of differing diameters. A main section 33 with the largest diameter has an annular recess in which a piston ring seal 34 is located and serves to seal the piston against the interior surface of the seat bush 9. A first end section 35 of relatively small diameter extends through a reduced diameter opening in the upper bonnet 7 to which it is sealed by a sealing ring 36. A second end section 37 bears against the valve member 17 and an intermediate section 38 is received in the part of the inner bore 14 that extends through the stack of disc springs 12 and the upper bonnet 7. A first annular shoulder 30 between the first end section 35 and the intermediate section 38 bears against a corresponding shoulder defined by the upper bonnet 7 so as to limit the upward travel of the piston. A second shoulder 31 between the intermediate and main sections 38, 33 is relatively narrow and bears against an inner edge of the upper stack of discs 12. During operation of the valve, upward movement of the upper piston 15 serves to compress the upper stack of disc springs 12 between the second shoulder 31 and the upper bonnet 7. The third annular shoulder 32 is defined between the main and second end sections 33, 37 of the piston, the latter section having a diameter selected to ensure that there is sufficient annular clearance to accommodate the desired volumetric flow rate.

The upper piston 15 effectively divides the inner bore 14 into two chambers, a first of the chambers being between the piston ring seal 34 and the valve member 17 and a second of the chambers being between piston ring seal 34 and the sealing ring 36.

The lower piston 16 comprises a piston head 40 that bears against the valve member 17 and a piston rod 41 that passes through the lower bonnet 8. The piston 16 is sealed to the bonnet 8 by two components: a piston ring 42 that is carried by the piston head; and a sealing ring 43 disposed in an annular groove in the internal wall of the lower bonnet 9. The sealing ring 43 seals against the external surface of piston rod 41. The interior of the lower bonnet 8 is effectively divided by the piston head 40 into two chambers: a first on the opposite side of the piston head 40 in communication with the first port and a second variable volume chamber 45 between the piston ring 42 and the sealing ring 43.

The lower piston 16 is biased towards the valve member 17 by means of a lower stack of disc springs 46 so as to force it against the valve seat surface 22. The lower stack of disc springs 46 act between on a spring seat 46a, to which the lower piston 16 is connected and a surface defined by an end wall of a spring housing 47 that is bolted to the valve body 1. The spring housing 47 is sealed to the body 1 against the ingress of seawater by means of an O-ring seal 48. The biasing force applied by the lower stack of disc springs 46 acts in opposition to the force applied by the upper stack of disc springs 12 that act against the second shoulder 31 of the upper piston 15.

In addition to the biasing forces applied by the disc springs 12, 46, the valve assembly may be manually operable by means of an actuator mechanism 50 provided at an upper end of the valve body 1. The mechanism 50 comprises a pair of disc-shaped cam plates 51, 52 interposed with three balls 53. A lower of the cam plates 52 is integrally connected to an actuator rod 54 that is received in the upper bonnet 7 and abuts the first end of the upper piston 15. The upper of the cam plates 52 is integrally connected to an upstanding boss 55 that is rotatable about an axis by an elongate handle 56.

The actuator mechanism 50 is enclosed by a housing 57 that is fixed to the valve body 1 by bolts and is sealed thereto against the ingress of seawater by means of an O-ring seal 58. The upstanding boss 55 projects through an opening in the housing 57 and is axially restrained against movement by means of a snap ring 59 that is secured in a shallow annular groove defined on the exterior surface of the boss 55. A concentric bush 60 disposed over the boss 55 sits on the upper surface of the upper cam plate 53 inside the housing 57 and also restricts axial movement.

Figure 4:
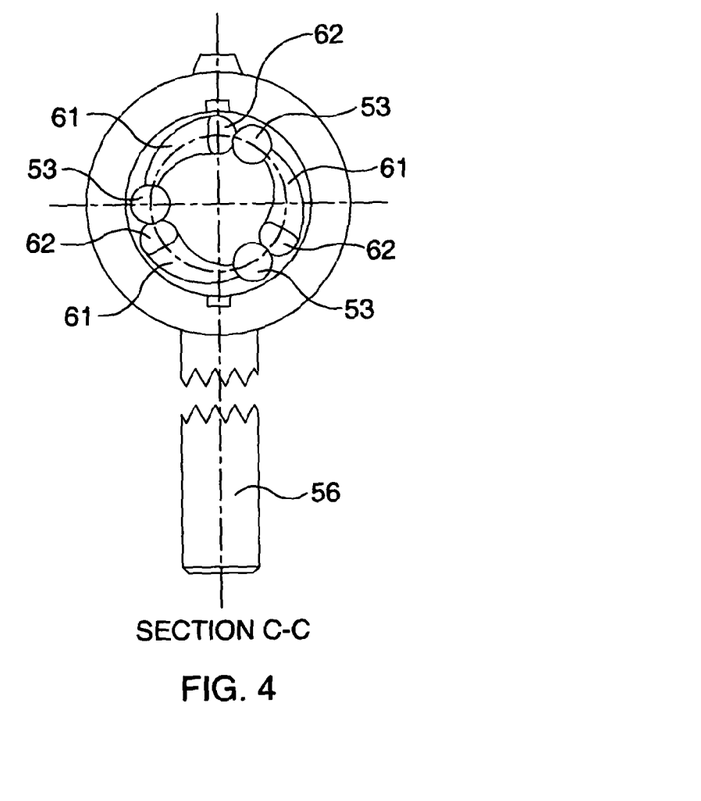
FIG. 4 is a sectioned view along line C-C of FIG. 1.

The actuator mechanism 50 is designed to translate rotational movement of the handle 56, boss 55 and upper cam plate 52 about the rotational axis into translation of the lower cam plate 51 and actuator rod 54 so as to effect axial movement of the upper piston 15 and valve member 17 in the bore 4. In order to convert the rotational movement, the lower surface of the upper cam plate 52 has three cam grooves 61 (FIG. 4) arranged substantially circumferentially around the periphery of the disc. Each groove 61 has a first end with a relatively shallow depth and a second end which terminates in a relatively deep ball seat 62. By using the handle 56, the boss 55 and upper cam plate 52 may be rotated so as to move the cam grooves 61 over the balls 53. Since the upper cam plate 52 is fixed against axial movement, this has the effect of moving the lower cam plate 51 and actuator rod 54 downwardly in the axial direction.

A wave spring 63 received in a recess in the upper surface of the upper bonnet 7 bears on the lower cam plate 51 and urges it upwardly towards the upper cam plate 52 to ensure good contact between cam balls 53 and plates 51, 52.

The actuator mechanism housing 57 and the spring housing 47 are both sealed against the ingress of fluid such as seawater and fluid from the flow path. This ensures that the pressure within the housings remains a selected low pressure (e.g. normal atmospheric pressure at sea level) when the valve is deployed subsea where the pressure is relatively high. The ends of the two pistons are then not subject to high pressures that vary with depth which would have the effect of creating additional imbalance to the forces acting on the valve member 17.

It will be appreciated that any suitable transmission mechanism may be used to convert rotational movement into translation of the upper piston 15. Although in the example embodiment the upper piston 15 is actuated with a cam actuator mechanism 50 it is to be understood that other actuators may be used. Moreover, alternative designs of cam mechanisms may be adopted. In applications where the pressures are not so high and/or the flow areas are smaller the actuator may be mechanical in the form of, for example, a push button, a plunger or lever. Alternatively, it may be in the form of a pneumatic pilot or an electrically operated solenoid.

In operation, the disc spring stacks 12, 46 act in opposite directions on the valve assembly. Without the first or second ports 2, 3 being pressurised the force applied to the lower piston 16 by the lower spring stack 46 is larger than that applied to the upper piston 15 by the upper spring stack 12. These forces act on opposite sides of valve member 17 and ensures that it is biased against the valve seat 21 to a closed position in which the path between the first and second ports 2, 3 is blocked. The valve member 17 may be displaced from the valve seat by operation of the actuator mechanism 50. Rotation of the handle 56 of the mechanism through a quarter turn is translated into a short downward axial movement of the actuator rod 54 and the upper piston 15 against the spring force of the second stack 46 so as to displace the valve member 17 from the valve seat 21. The valve member 17 now occupies an open position in which fluid may flow in the path between the first and second ports 2, 3.

When the first port 2 is pressurised with fluid this is conveyed to the chamber 45 on one side of the valve member 17 through the radial ports 19 in the seat bush 9, thus applying a force that tends to move the valve member 17 away from the valve seat 21. Similarly when the second port 3 is pressurised with the valve in the closed position fluid passes through a clearance between the valve member 17 and the lower bonnet 9 and applies an upward force that tends to move the valve member 17 towards the valve seat 21. These forces can be significant at high pressures and thus compensatory fluid pressure balancing is provided by means of first and second fluid passages 70, 71.

A first fluid passage 70 extends from the first port 2 to the central bore 4 and provides fluid communication with the variable volume chamber 45 in the lower bonnet 8. More particularly, the first fluid passage 70 connects to an annular recess 72 defined in the external surface of the lower bonnet 8. A plurality radially extending, angularly spaced bores 73 penetrate the wall of the lower bonnet 8 and provide communication between the recess 72 and the variable volume chamber 45. Fluid entering the chamber 45 is permitted to flow along the lower piston 16 between the piston ring 42 (supported by the piston head 40) and the sealing ring 43. When the first inlet is pressurised, the pressure of the fluid acts on the annular surface defined by the lower surface of the piston head 40 so as to impart an upwards force in the axial direction.

The second fluid passage 71 extends from the first port 2 to the central bore 4 and provides fluid communication with the inner axial bore 14. In particular, the second fluid passage 71 connects to an annular recess 74 defines in the external surface of the spacer 13. A plurality of radially extending, angularly spaced bores 75 penetrate the spacer 13 and allow fluid to flow from the first port 2 to the upper stack of disc springs 12. From there the fluid flows between the springs into the inner axial bore 14 and along the upper piston 7 in the chamber defined between the piston ring seal 34 and the sealing ring 36. When the second port 3 is pressurised, the pressure of the fluid acts on the first and second annular shoulders 30, 31 so as to impart a downwards force in the axial direction.

Figure 5:
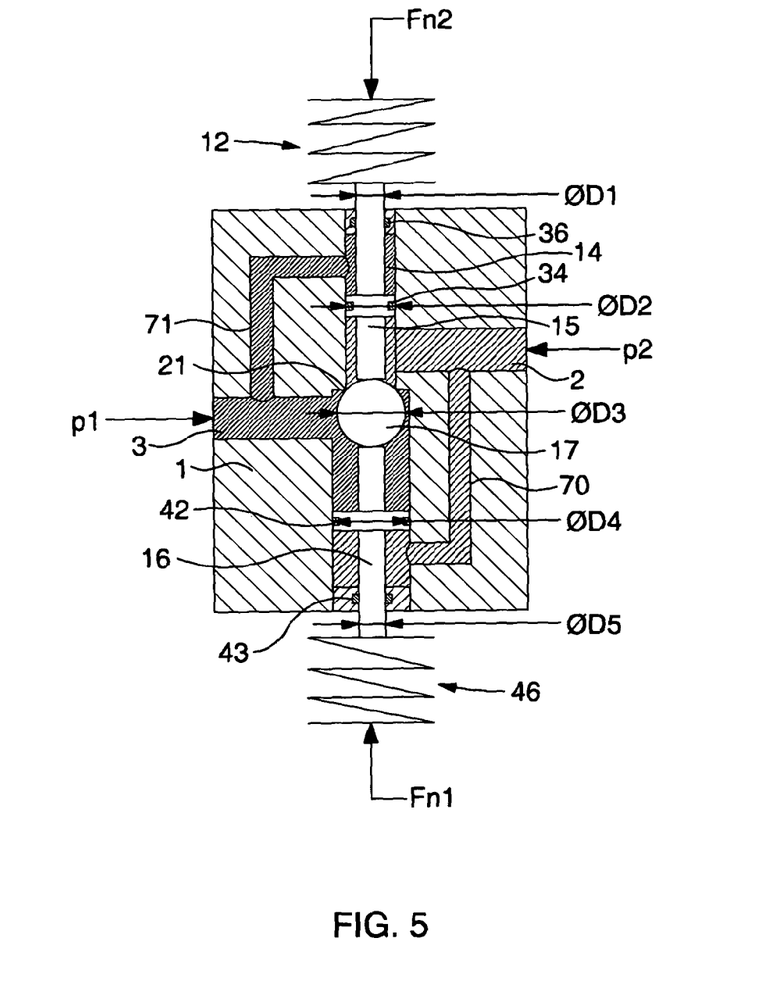
FIG. 5 is a schematic representation of the valve of FIGS. 1 to 3 to aid understanding.

The operation of the valve will now be described with reference to FIG. 5 of the drawings. FIG. 5 is a simplified schematic representation of the valve of FIGS. 1 to 4 provided in order to assist in understanding of the valve function.

The pressure of the fluid in the port 3 is designated P1 and the pressure of the fluid at the port 2 is designation P2. The spring force applied by the pre-compressed upper spring stack is designated Fn2, whereas the spring force applied by pre-compressed lower spring stack is designated Fn1.

The diameter at which the first end section 35 of the upper piston 15 is sealed by sealing ring 36 is designated D1 and similarly the diameter of the main section 33 at which it is sealed to the seat bush 9 by piston ring seal 34 is designated D2.

The diameter of the seating surface of the valve seat is designated D3. This is determined by the smallest seat diameter possible that permits the maximum flow required in the valve.

D4 represents the diameter at which the head 40 of the lower piston 16 is sealed to the lower bonnet 8 by the piston ring 42. D5 represents the diameter at which the lower piston rod 41 is sealed to the lower bonnet by sealing ring 43.

When the valve is in the closed position (valve member 17 is sealed against the valve seat 21) and the port 2 is pressurised by fluid at pressure P1, but the pressure at the port 3 is vented (P2=0), the following condition is satisfied:

$$(Fn1-P A4)+P A3 > P(A2-A1)+Fn2 \quad \text{(equation 1)}$$

Where
P—pressure of fluid;
$A1—\pi(D1/2)^2$
$A2—\pi(D2/2)^2$
$A3—\pi(D3/2)^2$
$A4—\pi(D4/2)^2$ In the event that both the ports 2, 3 are pressurised, then the following condition must be satisfied for the valve to remain closed:

$$(Fn1-P A4+P(A4-A5))+P A3 > P(A2-A1)+Fn2+P A3-P A2 \quad \text{(equation 2)}$$

Where $A5—\pi(D5/2)^2$

In the event that the port 3 is vented (P1=0) but the port 2 is pressurised, the following condition must be satisfied in order for the valve to remain in the closed position:

$$(Fn1+P(A4-A5)) > P A3 \quad \text{(equation 3)}$$

It is notable under these circumstances that the pressure P2 acts on the underside of the lower piston 16 so as to urge the piston upwards. This serves to isolate the piston from the biasing force applied by the lower spring stack 46, so the force Fn2 is not present in equation 3.

When the valve is opened by using the handle-operated actuator mechanism 50 and fluid is flowing (P1=P2 and non-zero) the following condition applies:

$$((Fn1+VtSr1)-PA4+P(A4-A5))<P(A2-A1)-PA2)+\\(Fn2-VtSr2)+HF \quad \text{(equation 4)}$$

Where HF—is the axial force applied to the upper piston 15 by virtue of turning the handle of the actuator mechanism (the "handle force").

Vt—is the axial length traveled by the valve member (and therefore the compression of the lower disc spring stack 46). This distance is determined by the diameter of the valve member 17 and the amount of travel that is required to displace the ball from its seat and permit the maximum flow required by the valve design.

Sr1—is the spring rate of the lower disc spring stack 46. This rate should be large enough to supply a spring return force to close the valve by overcoming seal frictions.

Sr2—is the spring rate of the upper disc spring stack 12. The lower this rate, the better, as the spring force must be overcome by the actuator mechanism 50 in order to open the valve.

Figure 6:
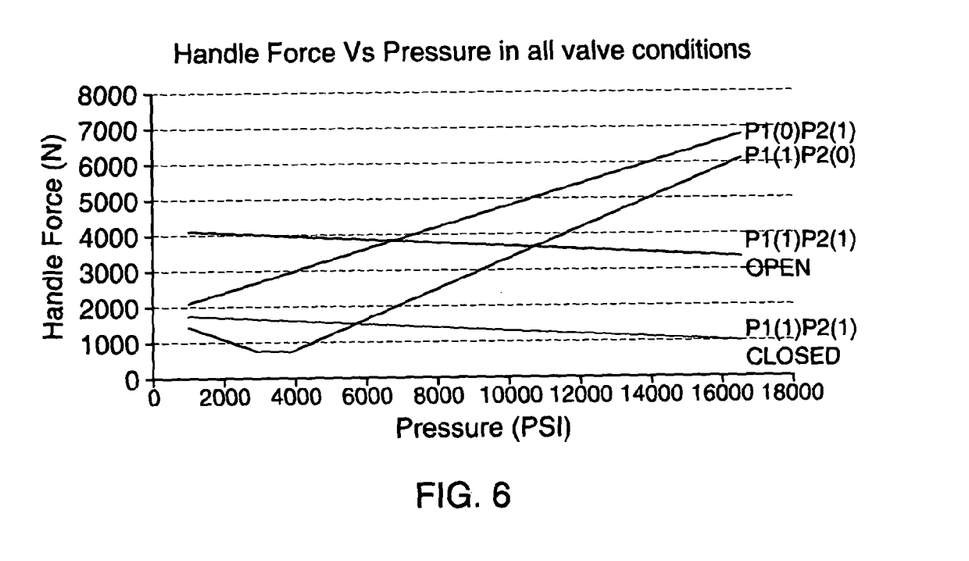
FIG. 6 is a graph plotting the handle force required to operate the valve of FIGS. 1 to 5 against the pressure of the fluid in the valve, for four different conditions.

FIG. 6 illustrates the force required to operate the actuator mechanism to open a valve (or further open the valve) in accordance with the exemplary embodiment for different prevailing fluid pressures in all four of the conditions referred to above. The four conditions are labelled using the terminology P(1) for a pressurised port and P(0) for a vented port. It can be seen that when the pressures at the first and second ports is the same (P1(1), P2(1)), the force required to operated the actuator mechanism is relatively low and decreases with increasing pressure.

The calculations used to produce the graph of FIG. 6 were based on an exemplary valve in which:

D1=4 mm, D2=9 mm, D3=12 mm, D4=12 mm, D5=5 mm, Fn1=2750, Fn2=948N, Sr1=790N/mm, Sr2=431N/mm and Vt=1.95 mm.

In the instance where the port 3 is pressurised but the port 2 is vented ((P1(1), P2(0)), the force required to operate the valve at relative low pressures is low but it increases substantially linearly above around 4,000 psi from about 760N to approaching 6000N at 16,000 psi.

In the instance where the port 3 is vented and the port 2 is pressurised (P1(0), P2(1)) the force increases linearly but is still remains below 7,000N at 16,000 psi.

The adoption of a free valve member that is separate from its valve stems with fluid pressure compensation allows the valve to be actuated with relatively low forces even at very high fluid pressures. It may therefore be used in place of conventional rotary ball valves.

It is to be understood that present invention could be used with a non-spherical valve member of convenient form. The spherical form however, tends to ensure self-alignment.

The opposing spring stacks provide for a degree of balancing but for high pressure application it is necessary to compensate with hydraulic balancing. In some low pressure applications the hydraulic compensation may not be required and balancing may be achieved by the spring forces alone.

It will be appreciated that numerous modifications to the above described design may be made without departing from the scope of the invention as defined in the appended claims. For example, the pistons may take any suitable form. Moreover, there may be one or more sliding components between each piston and the valve member such as, for example, elongate pins. Furthermore, the valve seat may be defined by an internal surface of the valve body rather than by a separate component. In addition, the seals 48 and 58 may be of a uni-directional sealing type such that they allow any build up of pressure in the central bore 4 to leak to the external environment. This may occur in the event that fluid leaks past the piston seals 36, 43 or past static seals on the upper and lower bonnets 7, 8. The uni-directional seals prevent the internal pressure in the body 1 exceeding the safe working load of the fixing bolts that secure the housings 47, 57.

The described and illustrated embodiments are to be considered as illustrative and not restrictive in character, it being understood that only the preferred embodiments have been shown and described and that all changes and modifications that come within the scope of the inventions as defined in the claims are desired to be protected. It should be understood that while the use of words such as "preferable", "preferably", "preferred" or "more preferred" in the description suggest that a feature so described may be desirable, it may nevertheless not be necessary and embodiments lacking such a feature may be contemplated as within the scope of the invention as defined in the appended claims. In relation to the claims, it is intended that when words such as "a," "an," "at least one," or "at least one portion" are used to preface a feature there is no intention to limit the claim to only one such feature unless specifically stated to the contrary in the claim. When the language "at least a portion" and/or "a portion" is used the item can include a portion and/or the entire item unless specifically stated to the contrary.

The invention claimed is:

1. A valve comprising a housing defining a fluid inlet, a fluid outlet and a fluid path extending between the fluid inlet and the fluid outlet; a valve chamber in the fluid path; the valve chamber having a least one valve seat; a valve member moveable along a first axis in the valve chamber between an open position in which the valve member is displaced from the valve seat such that the fluid inlet is connected to the fluid outlet and a closed position in which the valve member is sealed against the valve seat so that the fluid path is closed; first and second opposed biasing members of unequal loading applying a resulting biasing force to the valve member so as to bias it towards the closed position; a first piston member movable in a first bore relative to the valve member and for moving the valve member in a first direction along the first axis, and a second piston member movable in a second bore relative to the valve member for moving the valve member along the first axis in a second direction opposite to the first direction, a first pressure compensation passage extending between the fluid inlet and the first bore such that the first piston member is actuable by fluid pressure in the fluid inlet, a second pressure compensation passage extending between the fluid outlet and the second bore such that the second piston member is actuable by the fluid pressure in the fluid outlet; and an actuator for moving the valve member from the closed position to the open position.

2. The valve according to claim 1, wherein the first piston member divides the first bore into first and second fluid chambers, the first fluid chamber being in fluid communication with one side of the valve member, the second fluid chamber being in fluid communication with the first pressure compensation passage.

3. The valve according to claim 1, wherein the second piston divides the second bore into first and second fluid chambers, the first fluid chamber of the second bore being in fluid communication with one side of the valve member, the second fluid chamber of the second bore being in fluid communication with the second pressure compensation passage.

4. The valve according to claim 2, wherein the first piston is sealed in the first bore by first and second seals spaced along its length, the first pressure compensation passage directing fluid to the second fluid chamber in a first region between the first and second seals.

5. The valve according to claim 4, wherein the second piston is sealed in the second bore by third and fourth seals spaced along its length, the second pressure compensation passage directing fluid to the second fluid chamber in the second bore in a second region between the third and fourth seals.

6. The valve according to claim 4, wherein the first piston defines at least one first pressure surface between the first and second seals on which the fluid in the second fluid chamber may act.

7. The valve according to claim 6, wherein the at least one first pressure surface is in the form of an annular shoulder.

8. The valve according to claim 6, wherein the first piston defines at least one second pressure surface that is exposed to fluid in the first fluid chamber.

9. The valve according to claim 8, wherein the second piston divides the second bore into first and second fluid chambers, wherein the first fluid chamber of the second bore is in fluid communication with the fluid path when the valve member is in the open position such that fluid flowing between the fluid inlet and fluid outlet acts on the at least one second pressure surface so as to apply a force in opposition to any force applied to the at least one first pressure surface.

10. The valve according to claim 5, wherein the second piston defines at least one first pressure surface between the third and fourth seals on which the fluid in the second chamber of the second bore may act.

11. The valve according to claim 10, wherein the second piston defines at least one second pressure surface that is exposed to fluid in the first fluid chamber of the second bore.

12. The valve according to claim 11, wherein the first fluid chamber of the second bore is in fluid communication with the fluid path such that fluid flowing between the inlet and the outlet acts on the at least one second pressure surface so as to apply a force in opposition to any force applied to the at least one first pressure surface of the second piston.

13. The valve according to claim 1, wherein the actuator is a cam actuator that converts rotational movement of an operating handle into translation of an output member.

14. The valve according to claim 13, wherein the output member is in contact with the first piston such that movement of the output member effects translation of the first piston.

15. The valve according to claim 1, wherein the first and second biasing opposed members are pre-compressed springs.

* * * * *